United States Patent [19]

McMahon

[11] Patent Number: 4,595,830

[45] Date of Patent: Jun. 17, 1986

[54] MULTIMODE OPTICAL FIBER ACCELEROMETER

[75] Inventor: Donald H. McMahon, Carlisle, Mass.

[73] Assignee: Sperry Corporation, New York, N.Y.

[21] Appl. No.: 512,264

[22] Filed: Jul. 11, 1983

[51] Int. Cl.[4] .......................... G01D 5/34; G01P 15/08
[52] U.S. Cl. ................................ 250/227; 73/517 R; 250/231 R
[58] Field of Search ............................ 250/227, 231 R; 73/517 R; 350/96.15, 96.20; 356/32, 44

[56] References Cited

U.S. PATENT DOCUMENTS

| | | | |
|---|---|---|---|
| 3,073,168 | 1/1963 | Adams et al. | 73/517 R |
| 3,789,674 | 2/1974 | Anderson et al. | 73/517 R |
| 3,961,185 | 6/1976 | Brokenshire et al. | 73/517 R |
| 4,223,216 | 9/1980 | Quick et al. | 250/231 R |
| 4,239,963 | 12/1980 | August et al. | 250/231 R |
| 4,414,471 | 11/1983 | Rines | 250/227 |

Primary Examiner—Edward P. Westin
Attorney, Agent, or Firm—Howard P. Terry

[57] ABSTRACT

An apparatus for sensing acceleration utilizes a multimode input optical fiber to provide an output of light which passes through a grating, and is collimated by a grinrod lens. The collimated light is reflected from a double faceted reflecting surface in two beams. Absent acceleration, the two beams are focussed by the grinrod lens onto portions of the grating covering, respectively, the input faces of two multimode output optical fibers, and provide ½ the maximum possible amount of light to each of the output optical fibers, with a balanced output. In response to acceleration, the reflection surface tilts, the beams move, and the outputs of the output optical fibers change, representing the acceleration.

49 Claims, 9 Drawing Figures

MULTIMODE OPTICAL FIBER ACCELEROMETER

BACKGROUND OF THE INVENTION

1. Field of the Invention

The present invention relates generally to apparatus utilized to measure acceleration, and more particularly, to such apparatus employing optical fibers.

2. Description of the Prior Art

Accelerometers of the prior art include devices comprising a proof mass affixed to the end of an elastic beam. The elastic beam, owing to the inertia of the affixed proof mass, bends upon acceleration, providing a measurement thereof. Alternatively, upon acceleration, a feedback loop generates a counter-vailing force which maintains the original position of the proof mass. The acceleration is derived from a measurement of the necessary compensating force. Sensors in these prior art devices for detecting relevant changes from which the acceleration may be calculated, comprise mechanical or electromagnetic means, or combinations thereof. Thus, there is a need for an efficacious accelerometer entailing optical, in particular, optical fiber sensors.

SUMMARY OF THE INVENTION

The present invention provides an optical fiber apparatus for sensing phenomenon which engender movement. An input optical fiber receives light and provides, therefrom, an optical output. Means is utilized for responding to the phenomenon with representative movement, and for, upon movement, altering the path of the optical output of the input optical fiber. A plurality of output optical fibers provide optical output signals from light received from the input optical fiber after the light has interacted with the movement means. The output optical signals represent the movement of the responding means, and thereby represent the phenomenon.

The principles of the present invention are applied specifically to the sensing of acceleration. A first accelerometer embodiment comprises an elastic input optical fiber, fixed at a predetermined point along its length, which receives light and provides therefrom an optical output. A proof mass is affixed proximate the output end of the input optical fiber. In response to acceleration of the embodiment, the proof mass deflects about the fixed point of the input optical fiber. Two output optical fibers are disposed so that absent acceleration, each receives an equal amount of light emanating from the input optical fiber. The output optical fibers provide optical output signals representative of the deflection of the proof mass, and thereby representative of the applied acceleration.

A second accelerometer embodiment comprises an input optical fiber which receives light and provides therefrom an optical output. An elastic beam is fixed at one end, and a proof mass is affixed to the other end thereof. A planar mirror is affixed to the surface of the proof mass so that the mirror faces the output end of the input fiber. The mirror tilts in response to acceleration. A grinrod lens is disposed between the input optical fiber and the mirror. Two output optical fibers are disposed on the same end of the embodiment as the input optical fiber with their end faces directed towards the mirror and their ends in contact. Light emanating from the input optical fiber is collimated by the grinrods lens, reflected from the mirror disposed on the proof mass, and focussed as it passes again through the grinrod lens. Absent acceleration, the focussed light falls centered midway between the input faces of the output optical fibers. From the focussed light the output optical fibers provide optical output signals which are representative of the tilt of the mirror and thereby representative of the applied acceleration. By extending the focal length of the lens, greater sensitivity is provided in this embodiment.

A third accelerometer embodiment of the invention is similar to the second embodiment except that a double faceted mirror is employed; and a grating is disposed in contact with the end of a ¼ pitch grinrod lens such that the grating covers the faces of the optical fibers. Light emanating from the input optical fiber passes through the grating and is collimated by the ¼ pitch grinrod lens. The collimated light is reflected into two beams by the double faceted mirror and the two beams are focussed as they pass again through the lens. Absent acceleration, the two beams are focussed coextensively, respectively, on the faces of the output optical fibers such that, by means of the grating, ½ of the maximum available amount of light is received by each of the output optical fibers and such that, as the mirror tilts, the light received by one output optical fiber increases while the light received by the other decreases. With this arrangement, the sensitivity of the accelerometer is maximized. From the focussed beams the output optical fibers provide optical output signals which represent the tilt of the double faceted mirror and thereby represent the applied acceleration. The grating employed in this embodiment may be an absorption or a phase grating. A birefringent prism in conjunction with a planar mirror may be utilized in lieu of the double faceted mirror to bifurcate the collimated beam orignating with the input optical fiber. The other embodiments exhibit a nonlinear response to accelerations engendering relatively large displacements of the proof mass. Nonlinearity results from the varying overlap areas produced when a focussed beam is displaced more than a fraction of the core diameter of an output optical fiber. The problem is compounded with fibers possessing a substantial cladding thickness. Additionally, with relatively large displacements, significant intermodulation signals are likely to arise due to accelerations in a direction perpendicular to that desired.

The third embodiment of the present invention greatly mitigates such difficulties and also heightens sensitivity.

Commercially available multimode optical fibers may be employed with the embodiments of the present invention. The use of multimode optical fibers eliminates significant manufacturing and alignment difficulties associated with single mode optical fibers.

With the use of optical fibers, the accelerometer embodiments of the present invention provide sensors that are mechanically simple, low in cost, possess micro G sensitivity, have a high resonant frequency, are small, and are rugged. Further, these optical fiber embodiments have an inherently large dynamic range, communicate with a remote point via a high bandwidth, electrically non-conductive medium, are environmentally stable, are insensitive to electrical pick-up, and are usable at any wavelength.

Reliable LED sources, and passive time delay mutliplexing techniques are compatible with the optical fiber accelerometer embodiments of the present invention.

DESCRIPTION OF THE PREFERRED EMBODIMENTS

Figure 1:
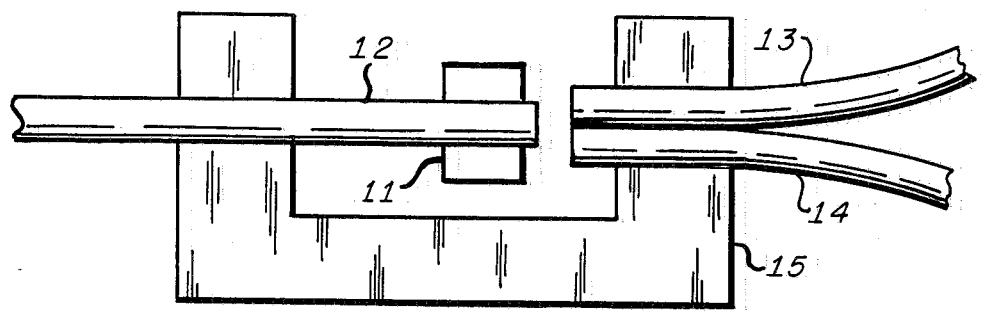
FIG. 1 is a cross sectional view of a first embodiment of the invention.
Figure 2:
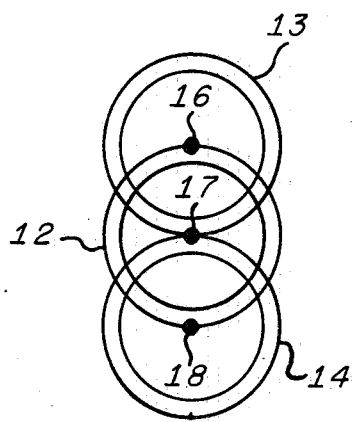
FIG. 2 is a diagrammatic representation of the alignment of the end faces of the optical fibers utilized in the first embodiment of the invention.

The invention comprises an accelerometer which utilizes optical fibers to sense displacements of a proof mass affixed to one end of an elastic beam. Such displacements represent the acceleration to which the apparatus is subjected. Referring to FIG. 1, a first embodiment of the invention is depicted. A proof mass 11 is affixed to the free end of an elastic input optical fiber 12. Output optical fibers 13 and 14 are disposed to sense a displacement of the proof mass 11 resulting from acceleration of the apparatus. The optical fibers 12, 13, and 14 are preferably multimode optical fibers. A support 15 fixes the output optical fibers 13 and 14 relative to the input optical fiber 12. In order to eliminate debonding and delamination of composite structures subject to high elastic strains, the proof mass 11, the elastic input optical fiber 12, and the region surrounding the fixating contact of the input optical fiber 12 with the support 15 preferably comprise a single piece of material. This material is preferably fused silica. Referring to FIG. 2, the alignment of the end faces of the optical fibers 12, 13, and 14 is illustrated. The output optical fibers 13 and 14 are arranged such that, in the absence of acceleration, each preferably receives an equal amount of light from the input optical fiber 12. The cross sections of the optical fibers 12, 13, and 14 are preferably annular, and of the same dimensions. The ends of the output optical fibers 13 and 14 are preferably in contact. Centers 16, 17, and 18 of, respectively, the end faces of the optical fibers 13, 12, and 14 are, when the optical fibers are viewed along the longitudinal axis of the input optical fiber 12, preferably colinear. In this fashion, light emanating from the input optical fiber 12 will fall centered, midway between the end faces of the output optical fibers 13 and 14.

In operation, the elastic input optical fiber 12 serves as an elastic beam on whose end the proof mass 11 is attached. Light is transmitted along the fiber 12, and radiates from the end upon which the proof mass 11 is situated. Absent acceleration, each of output optical fibers 13 and 14 receives an equal amount of light emanating from the end of the input optical fiber 12. When the apparatus experiences acceleration, the proof mass 11 is displaced and the input optical fiber 12 deflects. With a deflection of the input optical fiber 12, the quantity of light received by each of the output optical fibers 13 and 14 is altered. Accordingly, the angle of deflection of the input optical fiber 12 can be determined from the light transmitted by each of the output optical fibers 13 and 14. Since the angle of deflection provides a measure of the acceleration to which the apparatus is subject, the acceleration can be derived from an evaluation of the light transmitted by each of the output optical fibers 13 and 14. The apparatus can be employed to gauge accelerations which do not deflect the input optical fiber 12 beyond the range wherein light emanating from the input optical fiber 12, is transmitted to at least one of the output optical fibers 13 and 14.

The output optical fibers 13 and 14 create an "optical bridge" configuration. Differencing the optical outputs of output optical fibers 13 and 14, that is, detecting both outputs and sending them respectively to + and − terminals of a difference amplifier, provides for more stable operation that cancels light source noise. To mitigate the effects of light power variation, optical fiber and connector losses, etc., the output of the light source may be stabilized, or the output of the output optical fibers 13 and 14 may be processed with a difference over sum circuit.

The minimum detectable acceleration is determined by photon shot noise. Additional sensitivity can be gained by utilizing a laser light source and single mode optical fibers.

Figure 3:
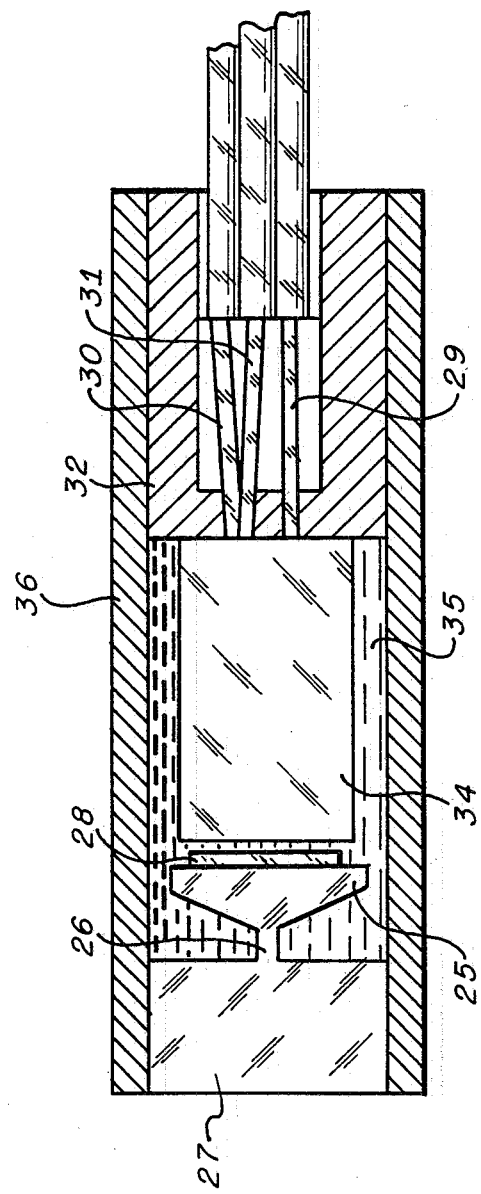
FIG. 3 is a cross sectional view of a second embodiment of the invention.

Referring to FIG. 3, a second embodiment of the invention is depicted. A proof mass 25 is affixed to one end of an elastic beam 26. A support 27 fixes the other end of the elastic beam 26. Preferably, the proof mass 25, the support 27, and the elastic beam 26 are constructed from a single piece of material in order to avoid debonding or delaminating resulting from severe elastic strains. This piece of material preferably comprises fused siica which provides high tensile strength with a high Young's modulus. A reflecting surface 28, such as a mirror, is disposed on the front of the proof mass 25. An input optical fiber 29 and output optical fibers 30 and 31 are disposed on the same end of the embodiment, with their end faces directed towards the reflecting surface 28 disposed on the proof mass 25. The optical fibers 29, 30, and 31 are preferably multimode optical fibers. A ferrule 32 may be utilized to position the input optical fiber 29 relative to the output optical fibers 30 and 31 by inserting the optical fibers 29, 30, and 31 into predetermined holes in the end of the ferrule 32. A lens 34 is disposed between the end faces of the optical fibers 29, 30, and 31 and the reflecting surface 28 disposed on the proof mass 25.

The lens 34 collimates, focuses, and acts as an optical lever. The end faces of the output optical fibers 30, and 31 are disposed in the focal region of the lens 34. Preferably, the lens 34 comprises a grinrod lens which may be positioned with respect to the optical fibers 29, 30, and 31 and then cemented in place. A damping fluid 35 preferably surrounds the lens 34, the proof mass 25, and the elastic beam 26. A cylindrical case 36 may be employed to contain the elements of this embodiment.

Devoid acceleration, light emanating from the end face of the input optical fiber 29 is collimated by the lens 34, reflected from the reflecting surface 28 disposed on the proof mass 25, and focussed by the lens 34. The focussed light preferably falls on the end faces of the output optical fibers 30 and 31 so as to inject an equal amount of light into each of the output optical fibers 30 and 31. The cross sections of the optical fibers 29, 30, and 31 are preferably annular and of the same dimensions. The longitudinal ends of the output optical fibers 30 and 31 are preferably in contact.

Figure 4:
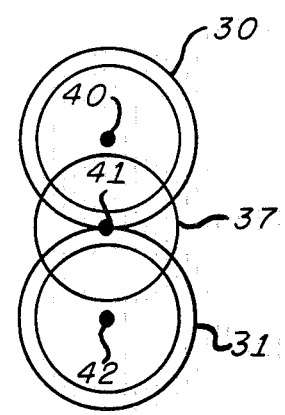
FIG. 4 is a diagrammatic representation of the alignment of a focussed beam of light on the end faces of two optical fibers utilized in the second embodiment.

Referring to FIG. 4, after being reflected from the reflecting surface 28, the light is focussed by the lens 34 as a circular spot 37. Absent acceleration, centers 40, 41, and 42, of, respectively, the end face of the output optical fiber 30, the circular spot 37, and the end face of the output optical fiber 31, are, when the end faces are viewed frontally, preferably colinear. Accordingly, the focussed light originating with the input optical fiber 29 falls centered, midway between the end faces of the output optical fibers 30 and 31; whereby, each of the output optical fibers 30 and 31 transmits an equal amount of the focussed light.

In operation, light emanating from the end face of the input optical fiber 29 is collimated by the lens 34. Devoid acceleration, the collimated light is reflected from the reflecting surface 28, and focussed, as in FIG. 4, as circular spot 37 centered midway between the end faces of the output optical fibers 30 and 31. Each of the output optical fibers 30 and 31 receives an equal amount of the focussed light which originates with the input optical fiber 29. When the embodiment experience acceleration, the proof mass 25 is displaced, tilting the reflecting surface 28, and thereby altering the path of the light reflected from the reflecting surface 28. Thus, upon acceleration, the spot 37 of focussed light moves, changing the quantity of light received by each of the output optical fibers 30 and 31. The tilt of the reflecting surface 28 can be determined from the light transmitted by each of the output optical fibers 30 and 31. Since the tilt of the reflecting surface 28 provides a measure of the acceleration to which the embodiment is subject, the acceleration can be derived from an evaluation of the light transmitted by each of the output optical fibers 30 and 31.

The embodiment can be utilized to measure accelerations which do not tilt the reflecting surface 28 beyond the range wherein the focussed light intersects at least one of the end faces of the output optical fibers 30 and 31. The light transmitted by the output optical fibers 30 and 31 may be processed as indicated in the first embodiment of the invention.

Longer focal lengths of the lens 34 provide greater sensitivity to a tilt of the reflecting surface 28, and therefore to applied acceleration.

Figure 5:
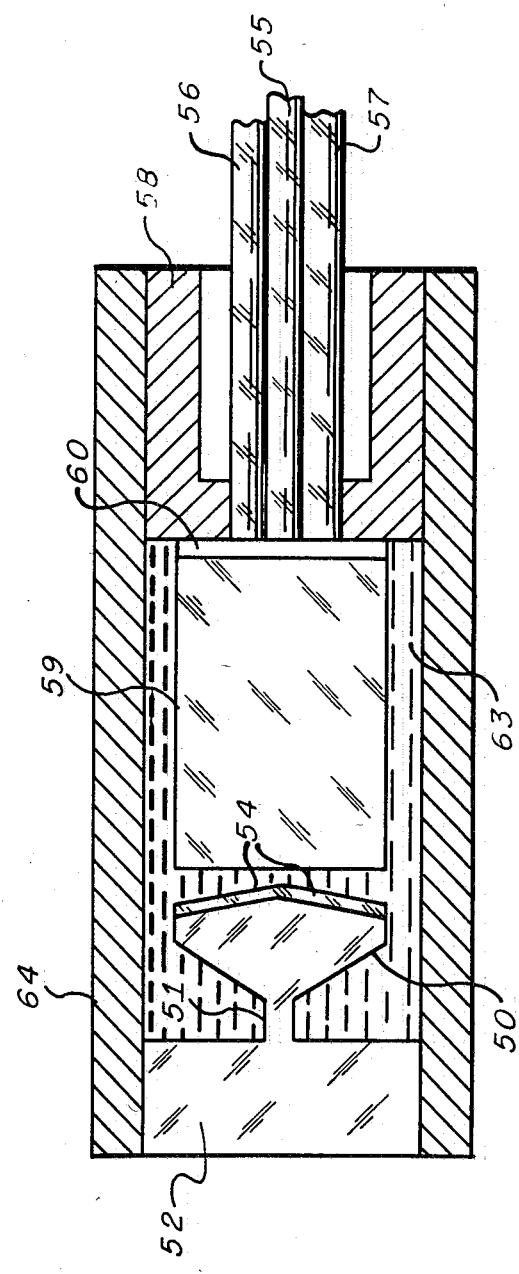
FIG. 5 is a cross sectional view of a third embodiment of the invention.

Referring to FIG. 5, a third embodiment of the invention is depicted. A proof mass 50 is affixed to one end of an elastic beam 51. A support 52 fixes the other end of the elastic beam 51. Preferably, the proof mass 50, the elastic beam 51, and the support 52 are constructed from a single piece of material. This material preferably comprises fused silica. A double faceted reflecting surface 54, such as two planar mirrors joined at a common edge, is disposed on the front of the proof mass 50. An input optical fiber 55 is disposed between output optical fibers 56 and 57 on the same end of the embodiment, with the end faces of the optical fibers 55, 56, and 57 directed towards the double faceted reflecting surface 54. The optical fibers 55, 56, and 57 are preferably multimode optical fibers. A ferrule 58 may be utilized to position the optical fibers 55, 56, and 57 by inserting them into a predetermined opening in the end of the ferrule 58.

Figure 7:
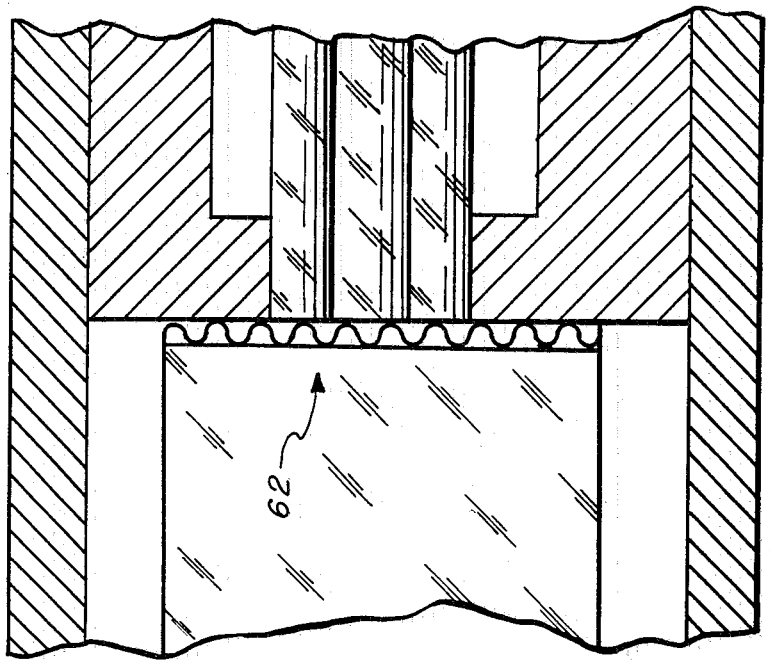
FIG. 7 is a fragmentary view in cross section of a portion of FIG. 5 illustrating a phase grating.
Figure 6:
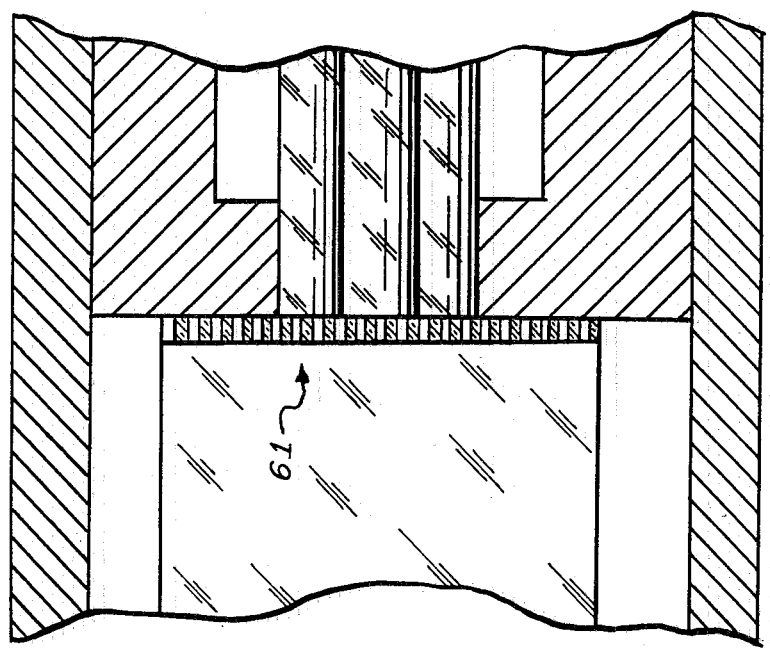
FIG. 6 is a fragmentary view in cross section of a portion of FIG. 5 illustrating an absorption grating.

A lens 59 is disposed between the end faces of the optical fibers 55, 56, and 57 and the double faceted reflecting surface 54. The lens 59 collimates, focusess, and acts as an optical lever. The end faces of the output optical fibers 56 and 57 are disposed in the focal region of the lens 59. A grating 60 is disposed between the lens 59 and the optical fibers 55, 56, and 57, covering the end faces of the optical fibers 55, 56, and 57. The portions of the grating 60 covering the end faces of the output optical fibers 56 and 57 are disposed in the focal region of the lens 59. Referring to FIG. 6 with continuing reference to FIG. 5, the grating 60 may comprise an absorption grating 61. The absorption grating 61 preferably comprises alternating opaque and transparent stripes each having the same width. The stripe width is preferably small compared to the width of the end faces of the optical fibers 55, 56, and 57. Referring to FIG. 7 with continuing reference to FIG. 5, the grating 60 may alternatively comprise a phase grating 62. The phase grating 62 comprises a repeating pattern of corrugations on a planar surface. The relief pattern may entail sinusoids, triangles, or the like. A phase grating useful with the present invention may also comprise a repeating pattern of varying indexes of refraction in a planar material. The width of an individual relief or index pattern is preferably small compared to the width of the end faces of the optical fibers 55, 56, and 57.

Preferably, the lens 59 comprises a ¼ pitch grinrod lens which may be positioned with respect to the optical fibers 55, 56, and 57 and then cemented in place. A damping fluid 63 preferably surrounds the lens 59, the proof mass 50, and the elastic beam 51. A cylindrical case 64 may be employed to contain the elements of this embodiment. The cross sections of the optical fibers 55, 56, and 57 are preferably congruent, and are preferably annular. The longitudinal ends of the output optical fibers 56, and 57 are preferably each in contact with the longitudinal end of the input optical fiber 55.

Light emanating from the end face of the input optical fiber 55 passes through the grating 60, and is collimated by the lens 59. Devoid acceleration, the collimated light is incident on the portion of the double faceted reflecting surface 54 containing the common edge of the two joined planar surfaces. The collimated light is reflected from the double faceted reflecting surface 54 in two beams which are focussed by the lens 59 as two circular spots. The two circular spots fall on the grating 60 preferably aligned coextensively, respectively, with the end faces of the output optical fibers 56 and 57. Each of the focussed circular spots, having originated with light emanating from the end face of the input optical fiber 55 which passed through the grating 60, entails an image of the grating 60. Since each focussed circular spot is aligned with an end face of an output optical fiber, the image of the grating entailed in the spot is superimposed on the actual grating which is disposed before the end face, creating a Schlieren optical system.

To create a linear response to applied acceleration, the image of the grating entailed in each spot is disposesd relative to the actual grating so that ½ of the maximum possible amount of light is transmitted to each of the end faces of the output optical fibers 56 and 57. In this state, the amount of light transmitted to each of the output optical fibers 56 and 57 changes most rapidly in response to acceleration, thereby providing for the greatest sensitivity of the apparatus. Further, the images of the grating are disposed to create a balanced output, that is, so that in response to acceleration, the quantity of light transmitted to one output optical fiber increases while the quantity of light transmitted to the other output optical fiber decreases. A balanced output permits processing, via differencing, of the light transmitted by each of the output optical fibers 56 and 57, as discussed with respect to the first embodiment.

Figure 8:
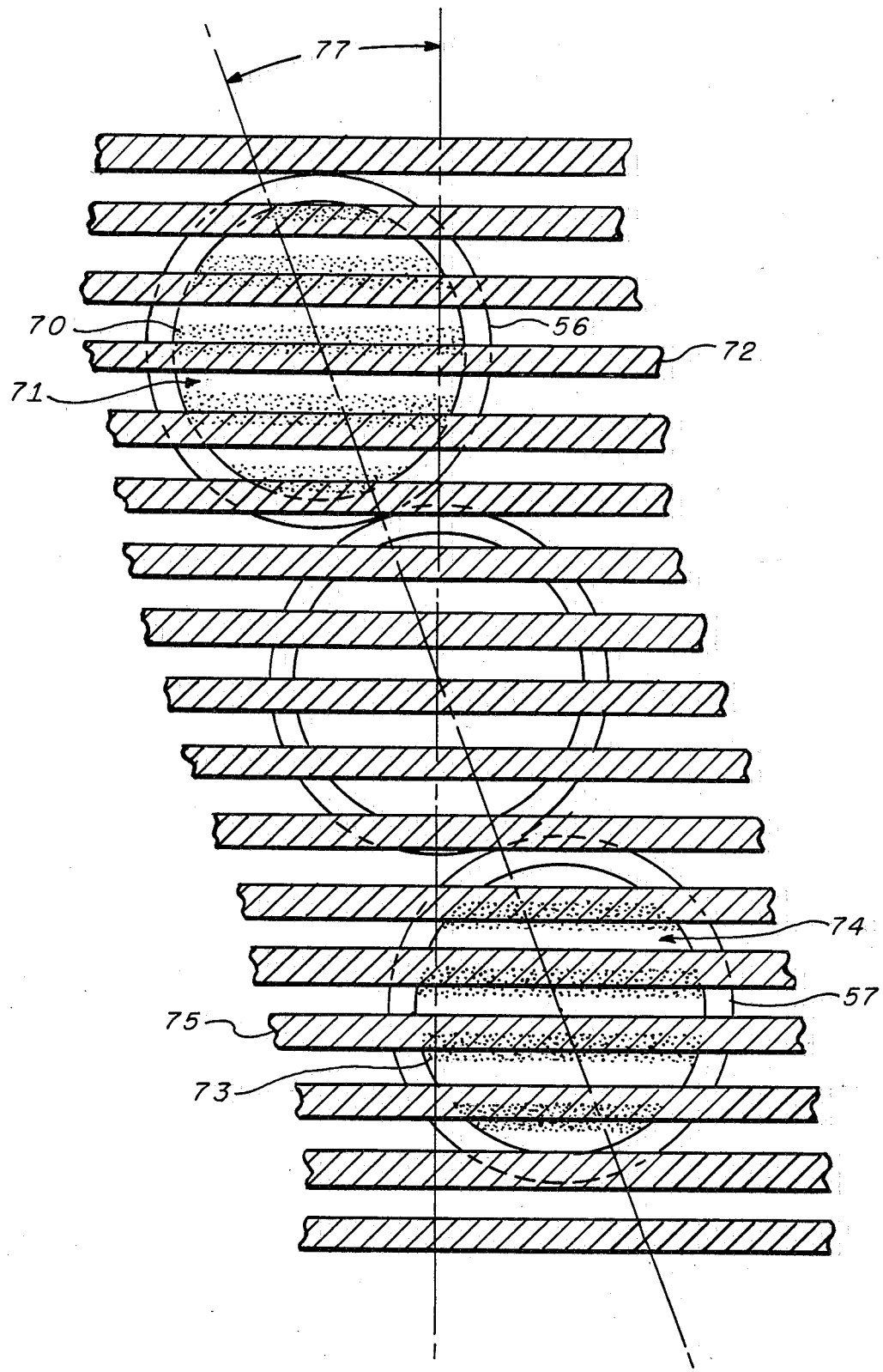
FIG. 8 is a diagrammatic representation of the alignment of the image stripes of an absorption grating relative to the actual stripes in order to maximize sensitivity and generate output signals having opposite polarity, in the third embodiment of the invention.

Referring to FIG. 8, the disposition of the images of the grating relative to the actual grating, to achieve a linear response to acceleration with a balanced output, is depicted for an absorption grating having alternating opaque and transparent stripes having the same width. The disposition of the images of a phase grating relative to a phase grating, to obtain the desired results, is analogous.

To transmit ½ of the maximum possible amount of light to each of the output optical fibers 56 and 57, the images of the stripes are displaced ½ the stripe width from actual stripes. To obtain a balanced output, the image stripes entailed in one focussed circle are displaced upward ½ stripe width, while the image stripes entailed in the other focussed circle are displaced downward a ½ stripe width.

For example, an image stripe 70 entailed in the focussed circular spot 71 which is aligned with the end face of output optical fiber 56, is displaced upward ½ stripe width from an actual stripe 72. An image stripe 73 entailed in the focussed circular spot 74 which is aligned with the end face of the output optical fiber 57 is displaced downward ½ stripe width from an actual stripe 75. Each of the output optical fibers 56 and 57 receives ½ the maximum possible amount of light. In response to acceleration, the double faceted reflecting surface 54 tilts, and the focussed circular spots 71 and 74 move in unison, either upward or downward. If the movement is upward, the light received by the output optical fiber 56 decreases as the images of opaque stripes occlude the actual transparent stripes. The light received by the output optical fiber 57 increases as the images of opaque stripes expose the actual transparent stripes. If the movement of the focussed circular spots 71 and 74 is downward, the converse is the case. Accordingly, a linear response to acceleration entailing the maximum rate of change of the light transmitted to each of the output optical fibers 56 and 57, and a balanced output are produced.

Displacing the image stripes by ½ stripe width relative to the actual stripes for one focussed circular spot is readily achieved by simple adjustments of the elements of the embodiment. To obtain an upward displacement of ½ stripe width for the image stripes of one focussed circular spot and a downward displacement of ½ stripe width for the image stripes of the other focussed circular spot requires an additional degree of freedom. This extra degree of freedom necessary to produce a balanced output is provided by rotating the grating stripes relative to the planes of reflection of the double faceted reflecting surface 54. This may be achieved by rotating the grating relative to the azimuthal orientation of the output optical fibers 56 and 57, that is, by rotating the grating in its plane. Referring to FIG. 8, the grating 60 is rotated in its plane an angle 77 to achieve the indicated alignment providing a balanced output.

More precise adjustments can be made when the longitudinal axes at the end faces of the output optical fibers 56 and 57 are perpendicular to the plane of the grating 60.

A maximum usable modulation of the light transmitted to the output optical fibers 56 and 57 occurs when the tilt of the double faceted reflecting surface 54 displaces the image stripes entailed in the focussed circular spots 71 and 74 ½ stripe width from the balanced output orientation. Accordingly, the sensitivity of this embodiment is independent of the diameter of the optical fibers, and is increased by the ratio of the inner diameter of the optical fibers to the grating stripe width.

A phase grating may be utilized in a similar fashion to provide the above results.

Referring to FIG. 5, in operation, light emanating from the end face of the input optical fiber 55 passes through the grating 60 and is collimated by the lens 59. Devoid acceleration, the collimated light is incident on the portion of the double faceted reflecting surface 54 containing the common edge of the two joined planar surfaces. The collimated light is reflected from the double faceted reflecting surface 54 in two beams which are focussed by the lens 59 as two circular spots. The two circular spots fall on the grating 60, preferably aligned, respectively, along the longitudinal axes of the ends of the output optical fibers 56 and 57, coextensively with the end faces of the output optical fibers 56 and 57. As indicated above, the image of the grating 60 entailed in each of the circular spots is disposed relative to the actual grating 60 so as to transmit ½ of the maximum possible amount of light to the output optical fibers 56 and 57, and so as to provide a balanced output. When the embodiment experiences acceleration, the proof mass 50 is displaced, tilting the double faceted reflecting surface 54, and thereby altering the paths of the two beams produced by reflection. Depending upon whether the tilt of the double faceted reflecting surface 54 is clockwise or counterclockwise, the circular spots move in unison downward or upward, changing the quantity of light received by each of the output optical fibers 56 and 57. As indicated above, with a tilt, one output optical fiber receives more light, and the other receives less. The light transmitted by each of the output optical fibers 56 and 57 represents the tilt of the double faceted reflecting surface 54, and thereby the applied acceleration.

Longer focal lengths of the lens 59 provide greater sensitivity to a tilt of the double faceted reflecting surface 54, and therefore to applied acceleration. The differencing technique utilized in conjunction with the first embodiment, for processing the light transmitted by the output optical fibers, may also be employed with this embodiment.

The embodiment can be utilized to measure accelerations which do not produce displacements of the images of the grating 60 relative to the grating 60 more than ¼ of the period of the grating. Greater displacements create a periodic output. When the grating 60 comprises an absorption grating having alternating opaque and transparent stripes of equal width, the limiting displacement corresponds to ½ a stripe width.

Figure 9:
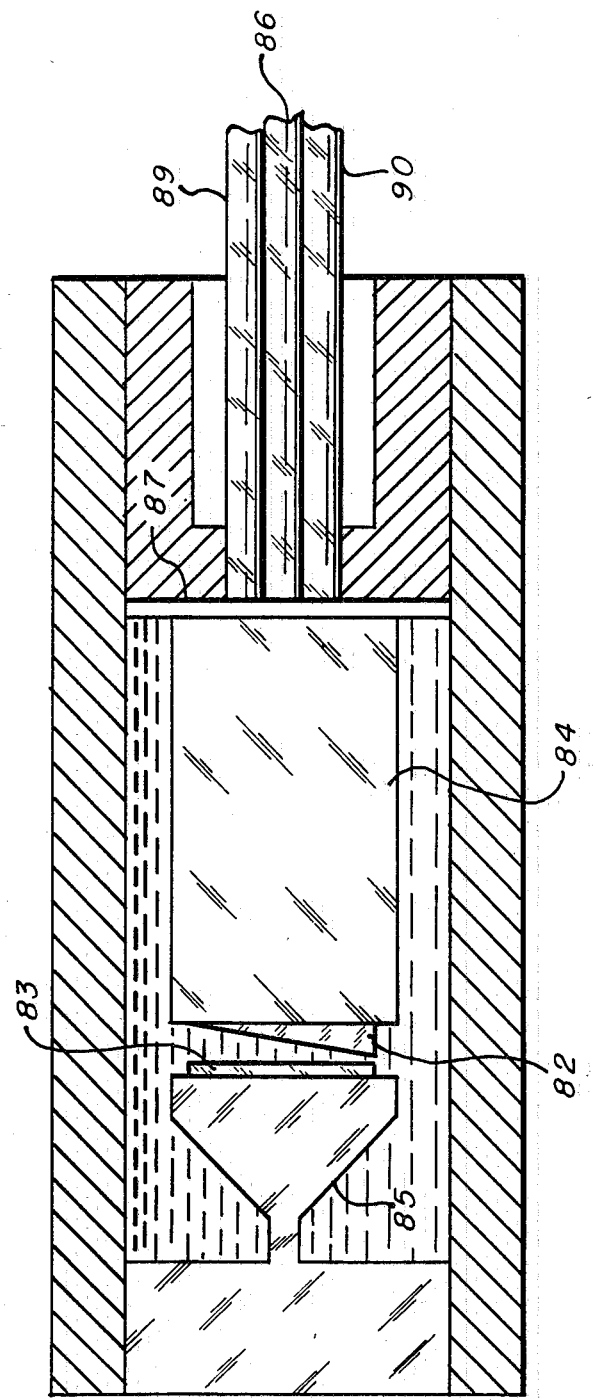
FIG. 9 is a cross sectional view of a fourth embodiment of the invention.

Referring to FIG. 9, a fourth embodiment of the invention comprises the third embodiment wherein a birefringent prism 82 and a planar reflecting surface 83 replace the double faceted reflecting surface. The planar reflecting surface 83 is disposed on the front of a proof mass 85. The birefringent prism 82 is disposed between a lens 84 and the planar reflecting surface 83. The lens 84 is preferably a ¼ pitch grinrod lens and the base of the birefringent prism 82 is preferably in contact with the end face of the grinrod lens. The birefringent prism 82 possesses different indices of refraction for light polarized in two orthogonal directions.

In operation, devoid acceleration, light emanating from an input optical fiber 86 passes through a grating 87, is collimated by the lens 84, passes through the birefringent prism 82, is reflected from the planar reflecting surface 83, passes again through the birefringent prism 82, and emerges as two beams which are focussed, as in the third embodiment, on the grating 87, aligned coextensively with the end faces of the output optical fibers 89 and 90. The general operation of the fourth embodiment is the same as that of the third embodiment; the foruth embodiment merely entails an alternate means of providing two beams.

Any means which bifurcates the collimated light for focussing on the end faces of the two output optical fibers suffices for purposes of the third embodiment.

Due to the smaller angular displacement required to produce external optical signals, sensitivity in the third embodiment to orthogonal accelerations is greatly reduced. Additional discrimination against orthogonal accelerations is obtained by utilizing an elastic beam least thick in the dimension accommodating the desired tilt.

In accordance with the principles of the invention, three, four or more output optical fibers may be utilized rather than two, in order to simultaneously sense accelerations in two orthogonal directions.

More generally, by implementing the principles of the invention, any phenomenon which engenders movement may be sensed. Such phenomena include, but are not limited to, temperature, pressure, rotation, altitude, and magnetism. An embodiment of the invention for sensing a phenomenon which engenders movement comprises an input optical fiber which receives light and provides an optical output from an end face. Means is employed for producing movement in response to the phenomenon, the movement being representative of the degree of the phenomenon, the means additionally for altering, upon movement, the path of light which originates from the input optical fiber.

A plurality of output optical fibers provide optical outputs from light received from the input optical fiber, the light being received after any effect thereupon by the means. The individual optical outputs of the output optical fibers considered collectively represent the movement of the means, and thereby represent the degree of the phenomenon.

While the invention has been described in its preferred embodiments, it is to be understood that the words which have been used are words of desription rather than limitation and that changes may be made within the purview of the appended claims without departing from the true scope and spirit of the invention in its broader aspects.

We claim:

1. A grating accelerometer, comprising:
    light input means, having an output face, for receiving light and providing an output of light from said output face;
    an elastic beam, having two ends, fixed at a first end;
    means for fixing said elastic beam at said first end;
    a proof mass, affixed to a second end of said elastic beam, for assuming a tilt in response to acceleration applied to said accelerometer, said tilt being representative of a degree of said acceleration;
    a grating, disposed before and covering said output face of said light input means;
    lens means, disposed between said grating and said proof mass, for transforming light passing through said grating from said output face of said light input means into a collimated beam;
    bifurcating means, disposed between said proof mass and said lens means, responsive to said tilt of said proof mass, for producing two beams of light from said collimated beam, and for projecting said two beams of light into said lens means,
    said lens means additionally for focussing said two beams of light;
    two light output means, each having an input face disposed in a focal region of said lens means, each for receiving light with said input face, and each for providing an output of light,
    said grating being disposed in said focal region of said lens means between said lens means and said input faces of said two light output means covering said input faces,
    said outputs of light of said two light output means being produced from light received from, respectively, said two beams, after said two beams are focussed by said lens means and pass through said grating, individual outputs of light of said two light output means considered together being representative of said tilt of said proof mass, and thereby being representative of said degree of said acceleration.

2. An accelerometer as in claim 1 wherein said bifurcating means comprises two planar reflecting surfaces meeting at a predetermined angle to form an edge, said reflecting surfaces affixed to said proof mass, facing said output face of said light input means so that, absent acceleration, said collimated beam is incident on a portion of said two planar reflecting surfaces containing said edge.

3. An accelerometer as in claim 2 wherein said light input means comprises an input optical fiber, having an output end on which said output face is disposed, and wherein said light output means comprises an output optical fiber, having an input end on which said input face is disposed.

4. An accelerometer as in claim 3 wherein said two beams, absent acceleration, fall on said grating at regions covering, respectively, said input faces of said output optical fibers.

5. An accelerometer as in claim 4 wherein said input optical fiber and said two output optical fibers each have an annular cross section of the same dimensions, said input faces of said two output optical fibers are facing said two planar reflecting surfaces, and wherein said two beams are focussed on said grating in substantially coextensive alignment with, respectively, said input faces of said output optical fibers.

6. An accelerometer as in claim 5 wherein light received by said input faces of said output optical fibers from, respectively, said two beams after passing through said grating is ½ a maximum possible amount, and wherein said outputs of light of said output optical fibers are balanced.

7. An accelerometer as in claim 6 wherein said optical fibers comprise multimode optical fibers.

8. An accelerometer as in claim 7 wherein said lens means comprises a ¼ pitch grinrod lens.

9. An accelerometer as in claim 8 wherein said grating comprises an absorption grating.

10. An accelerometer as in claim 9 wherein said absorption grating comprises a repeating pattern having a period which is small compared to an inner radius of said annular cross section of said optical fibers.

11. An accelerometer as in claim 10 wherein said absorption grating comprises alternating opaque and transparent stripes of substantially equal width, said width being small compared to said inner radius of said annular cross section.

12. An accelerometer as in claim 11 wherein said fixing means comprises a support, having said first end of said elastic beam affixed thereto.

13. An accelerometer as in claim 12 further comprising a ferrule having an end and holes in said end, disposed so that said grating lies between said end of said ferrule and said ¼ pitch grinrod lens, said optical fibers being inserted in said holes for positioning.

14. An accelerometer as in claim 13 further comprising damping fluid, said damping fluid being disposed about said grinrod lens, said proof mass, said two planar reflecting surfaces, and said elastic beam.

15. An accelerometer as in claim 14 wherein said reflecting surfaces comprise mirrors.

16. An accelerometer as in claim 15 wherein said proof mass, said elastic beam, and said support comprise a single piece of material.

17. An accelerometer as in claim 16 further comprising case means, for compactly containing elements of said accelerometer.

18. An accelerometer as in claim 8 wherein said grating comprises a phase grating.

19. An accelerometer as in claim 18 wherein said phase grating comprises a repeating pattern having a period which is small compared to an inner radius of said annular cross section of said optical fibers.

20. An accelerometer as in claim 19 wherein said fixing means comprises a support having said first end of said elastic beam affixed thereto.

21. An accelerometer as in claim 20 further comprising a ferrule having an end and holes in said end, disposed so that said grating lies between said end of said ferrule and said ¼ pitch grinrod lens, said optical fibers being inserted in said holes for positioning.

22. An accelerometer as in claim 21 further comprising damping fluid, said damping fluid being disposed about said grinrod lens, said proof mass, said two planar reflecting surfaces, and said elastic beam.

23. An accelerometer as in claim 22 wherein said reflecting surfaces comprises mirrors.

24. An accelerometer as in claim 23 wherein said proof mass, said elastic beam, and said support comprise a single piece of material.

25. An accelerometer as in claim 24 further comprising case means, for compactly containing elements of said accelerometer.

26. An accelerometer as in claim 11 wherein said bifurcating means comprises a planar reflecting surface affixed to said proof mass, disposed between said proof mass and said lens means, facing said output face of said light input means,
and a birefringent prism disposed between said lens means and said planar reflecting surface, so that said collimated beam passes through said birefringent prism, is reflected from said planar reflecting surface, passes again through said birefringent prism, and emerges from said birefringent prism as two beams which pass into said lens means.

27. An accelerometer as in claim 26 wherein said light input means comprises an input optical fiber,
and wherein said light output means comprises at least two output optical fibers.

28. An accelerometer as in claim 27 wherein said two beams, absent acceleration, fall on said grating at regions covering, respectively, said input faces of said output optical fibers.

29. An accelerometer as in claim 28 wherein said input optical fiber and said two output optical fibers each have an annular cross section of the same dimensions, said input faces of said two output optical fibers are facing said planar reflecting surface, and wherein said two beams, absent acceleration, are focussed on said grating in substantially coextensive alignment with, respectively, said input faces of said output optical fibers.

30. An accelerometer as in claim 29 wherein light received by said input faces of said output optical fibers from, respectively, said two beams after passing through said grating is ½ a maximum possible amount, and wherein said outputs of light of said output optical fibers are balanced.

31. An accelerometer as in claim 30 wherein said optical fibers comprise multimode optical fibers.

32. An accelerometer as in claim 31 wherein said lens means comprises a ¼ pitch grinrod lens.

33. An accelerometer as in claim 32 wherein said grating comprises an absorption grating.

34. An accelerometer as in claim 33 wherein said absorption grating comprises a repeating pattern having a period which is small compared to an inner radius of said annular cross section of said optical fibers.

35. An accelerometer as in claim 34 wherein said absorption grating comprises alternating opaque and transparent stripes of substantially equal width, said width being small compared to said inner radius of said annular cross section.

36. An accelerometer as in claim 35 wherein said fixing means comprises a support, having said first end of said elastic beam affixed thereto.

37. An accelerometer as in claim 36 further comprising a ferrule having an end and holes in said end, disposed so that said grating lies between said end of said ferrule and said ¼ pitch grinrod lens, said optical fibers being inserted in said holes for positioning.

38. An accelerometer as in claim 37 further comprising damping fluid, said damping fluid being disposed about said grinrod lens, said birefringent prism, said planar reflecting surface, said proof mass, and said elastic beam.

39. An accelerometer as in claim 38 wherein said planar reflecting surface comprises a mirror.

40. An accelerometer as in claim 39 wherein said proof mass, said elastic beam, and said support comprise a single piece of material.

41. An accelerometer as in claim 40 further comprising case means, for compactly containing elements of said accelerometer.

42. An accelerometer as in claim 32 wherein said grating comprises a phase grating.

43. An accelerometer as in claim 42 wherein said phase grating comprises a repeating pattern having a period which is small compared to an inner radius of said annular cross section of said optical fibers.

44. An accelerometer as in claim 43 wherein said fixing means comprises a support, having said first end of said elastic beam affixed thereto.

45. An accelerometer as in claim 44 further comprising a ferrule having an end and holes in said end, disposed so that said grating lies between said end of said ferrule and said ¼ pitch grinrod lens, said optical fibers being inserted in said holes for positioning.

46. An accelerometer as in claim 45 further comprising damping fluid, said damping fluid being disposed about said grinrod lens, said birefringent prism, said planar reflecting surface, said proof mass, and said elastic beam.

47. An accelerometer as in claim 46 wherein said planar reflecting surface comprises a mirror.

48. An accelerometer as in claim 47 wherein said proof mass, said elastic beam, and said support comprise a single piece of material.

49. An accelerometer as in claim 48 further comprising case means, for compactly containing elements of said accelerometer.

* * * * *